(12) United States Patent
Smith

(10) Patent No.: US 12,083,963 B2
(45) Date of Patent: Sep. 10, 2024

(54) ALUMINUM SPEAKER BRACKET

(71) Applicant: David Smith, Marietta, GA (US)

(72) Inventor: David Smith, Marietta, GA (US)

( * ) Notice: Subject to any disclaimer, the term of this patent is extended or adjusted under 35 U.S.C. 154(b) by 0 days.

(21) Appl. No.: 17/349,116

(22) Filed: Jun. 16, 2021

(65) Prior Publication Data

US 2022/0402442 A1 Dec. 22, 2022

(51) Int. Cl.
*B60R 11/02* (2006.01)
*B60R 11/00* (2006.01)
*H04R 1/02* (2006.01)

(52) U.S. Cl.
CPC .......... *B60R 11/0217* (2013.01); *H04R 1/025* (2013.01); *B60R 2011/0052* (2013.01); *H04R 2499/13* (2013.01)

(58) Field of Classification Search
CPC ... B60L 1/0217; H04R 1/025; H04R 2499/13; B60R 2011/0052

USPC .......................................................... 381/86
See application file for complete search history.

(56) References Cited

U.S. PATENT DOCUMENTS

| | | | | |
|---|---|---|---|---|
| 5,414,229 A | * | 5/1995 | Rocheleau | H04R 1/025 181/150 |
| 9,516,396 B2 | * | 12/2016 | Andrews | H04R 1/025 |
| 2003/0019983 A1 | * | 1/2003 | Linuma | B60R 11/0223 248/200 |
| 2003/0235323 A1 | * | 12/2003 | Chuang | H04R 1/025 381/386 |
| 2012/0167888 A1 | * | 7/2012 | Taylor | B01D 53/0415 128/205.12 |

* cited by examiner

*Primary Examiner* — Sean H Nguyen
(74) *Attorney, Agent, or Firm* — Briggs IP; Jeremy A. Briggs

(57) ABSTRACT

Systems and methods are disclosed herein for an audio speaker bracket for use water based and land-based vehicles and a method for installing the speaker to a mounting panel using at least one suspension member. The method permits the speaker to be supported by a secure attachment of the bracket to the vehicle is proposed.

20 Claims, 8 Drawing Sheets

ALUMINUM SPEAKER BRACKET

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND

Field of the Invention

Embodiments relate to the field of audio system speaker mounting brackets, and more particularly relates to brackets for any type of vehicle especially water rides, golf carts, ATV and jet ski allowing the user to install speaker system.

Description of the Related Art

The demand for high-quality speakers has increased dramatically over the last twenty years. As a consequence, there is a large selection of high-quality speakers available on the market. To meet with popularity of various kinds of speakers, a variety of speaker fixing systems for fixing and supporting the speakers are developed.

It is known that the positioning, arrangement and orientation of speakers in commercial and residential settings can affect the quality of sound from a sound system. Currently, many approaches have been taken to the positioning of speakers in a room, cinema, theaters, or vehicle, in order to optimize the quality of sound from a system.

Recreational vehicles may include video systems including televisions and speakers for the televisions. Due to the limited amount of space that may be available in recreational vehicles, there is an ongoing need to configure and arrange items and amenities in recreational vehicles so as to reduce the amount of space taken up by such items and amenities. Some conventional speaker systems used in recreational vehicles include brackets that project into the occupant space of the vehicle and that have speakers, such as cube style speakers, mounted to the brackets. Occupants may sometimes bump their heads on these types of speakers or brackets. In addition, these types of speakers and brackets may obstruct the vision of vehicle occupants. Furthermore, vehicle motion and vibrations may cause the speakers to shift relative to the brackets into unwanted positions.

In case of Jet skis which are relatively new recreational vehicles. They are compact and two or more can be loaded for transport into the bed of a pickup truck or upon a trailer. The most common practice is to bring the jet ski from home or its other place of storage to water for each recreational event. In the water, they are mobile and maneuverable. However, the utility in terms of music is difficult to acquire in these vehicles.

There are multiple inventions that have been proposed in prior art regarding bringing advancements in jet skis. However, the presentation of speaker attachment system isn't seen in prior art.

The current invention proposes an enhanced design of a lightweight, simple in use and durable speaker support system. It is an easy-to-use assembly which can be attached and detached easily and provides support for diverse articles of speaker system.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

It is therefore the purpose of the invention to alleviate at least to some extent one or more of the aforementioned problems of the prior art and/or to provide the relevant public with a suitable alternative thereto having relative advantages.

The primary object of the invention is related to the provision of improved mounting bracket for mounting an article, such as an audio speaker, to a support surface.

It is also the objective of present invention, to provide an apparatus comprising a speaker mounted in a vehicle and has one or more of the following features or combinations thereof. The vehicle may be a recreational vehicle. The speaker may be supported relative to a ceiling of the recreational vehicle.

It is also the objective of the invention to provide a support mounting bracket of the present invention includes a first mounting plate removably attachable to a support surface. It mounts using stainless steel mounting hardware stainless steel nuts and bolts.

It is also the objective of invention to provide half inch rubber feet that allow it to conform to any type of flat or slightly rounded surface.

It is moreover the objective of the invention to provide a structure which can be fixed easily to the any type of water-based vehicles including but not limited to jet skis, water cart and land-based vehicles like golf carts.

It is also the objective of the invention to provide an assembly which can be conveniently attached or detached.

It is moreover the objective of the invention to provide a device which is reliable and comes in variety of colors.

It is further the objective of the invention to provide a dual and reliable assembly where the features remain operational and intact even after long time usage.

It is moreover the objective of the invention to provide a system which is made of high-quality steel and provide not only luxury look and feel, but very sturdy construction to last.

It is also the objective of invention to provide convivence in use, which requires no cutting or drilling.

It is further the objective of the invention to provide an aluminum bracket which is easy to use, inexpensive and is easy to carry thus is highly portable and provides an advance methodology in similar domain.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
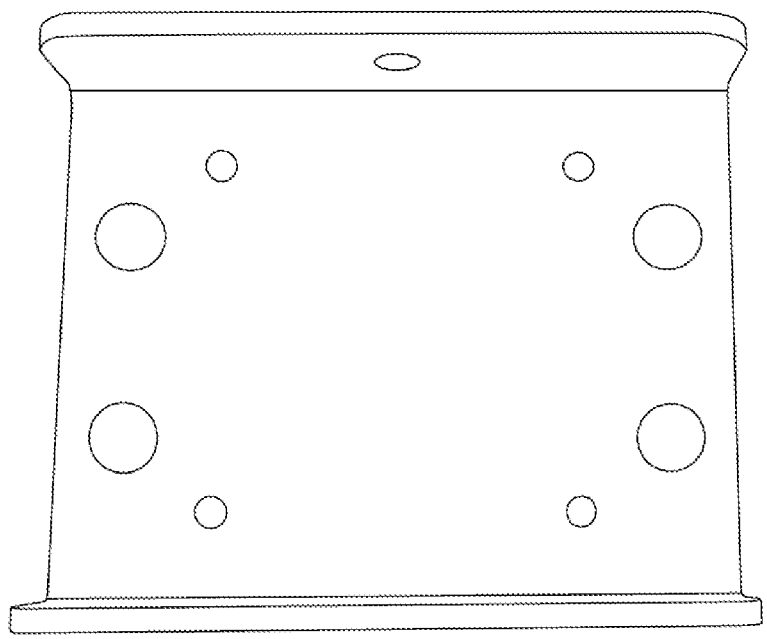
FIG. 1 illustrates first view proposed bracket assembly for jet ski, in accordance with an embodiment of the present disclosure.
Figure 2:
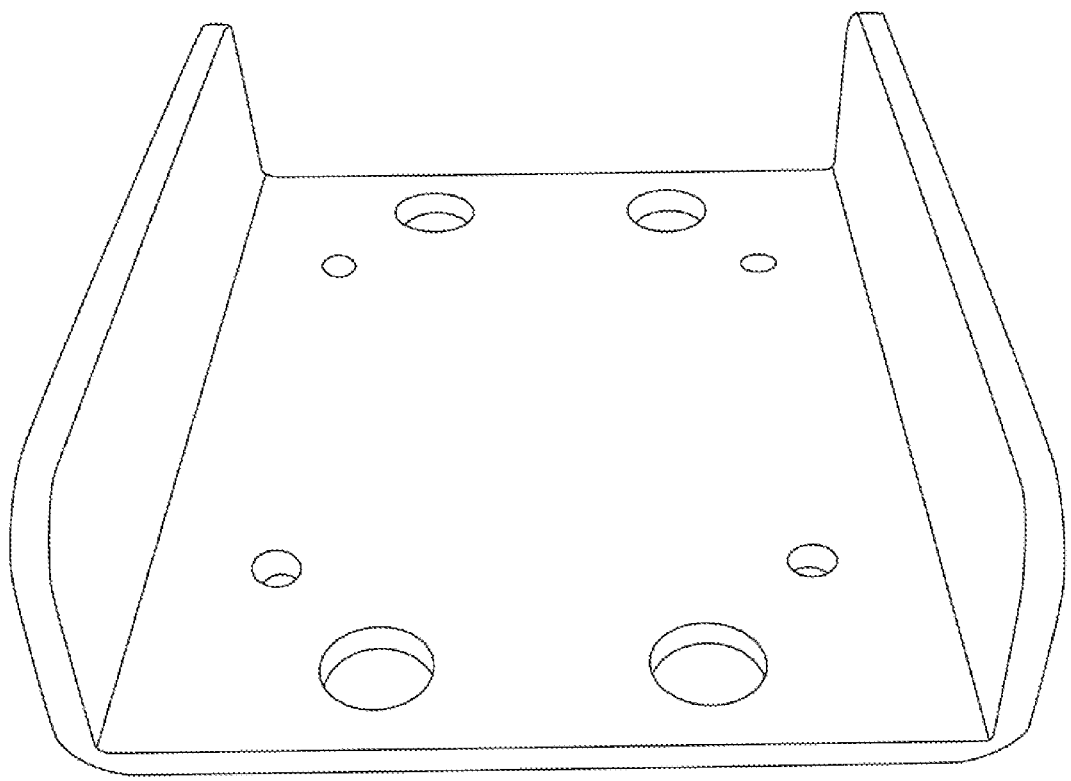
FIG. 2 illustrates second of proposed bracket assembly, in accordance with an embodiment of the present disclosure.
Figure 3:
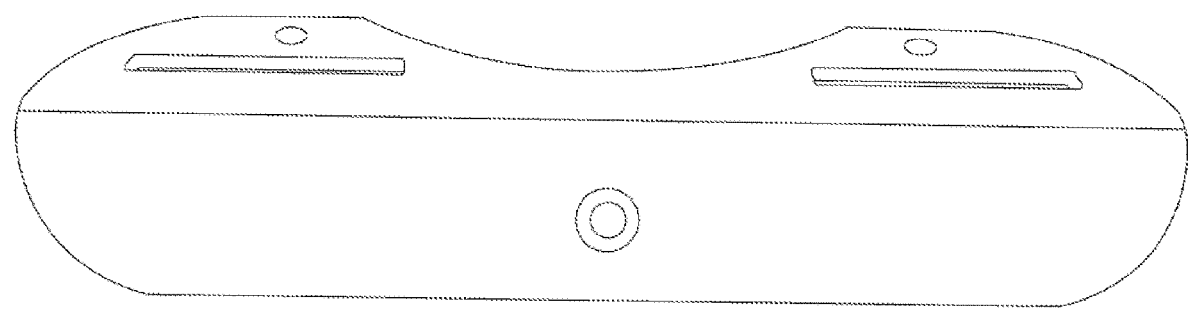
FIG. 3 illustrates installed view of jet-ski bracket assembly, in accordance with an embodiment of the present disclosure.
Figure 4:
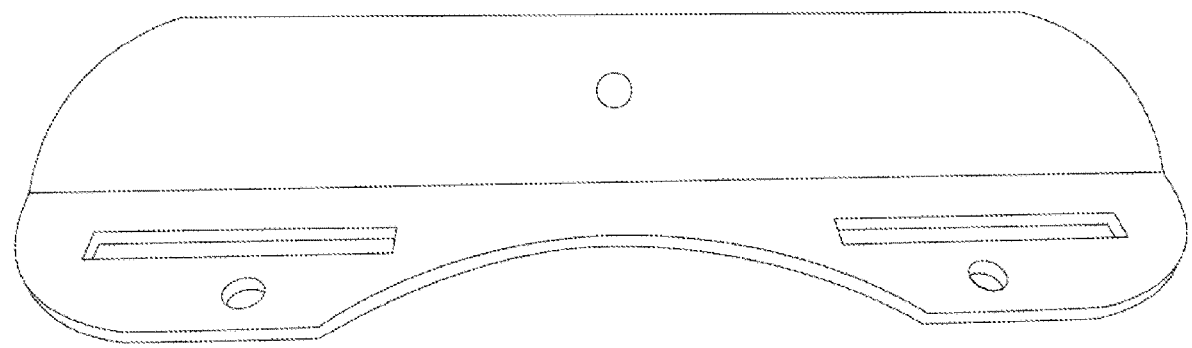
FIG. 4 illustrates another view of jet-ski brackets assembly, in accordance with an embodiment of the present disclosure.
Figure 5:
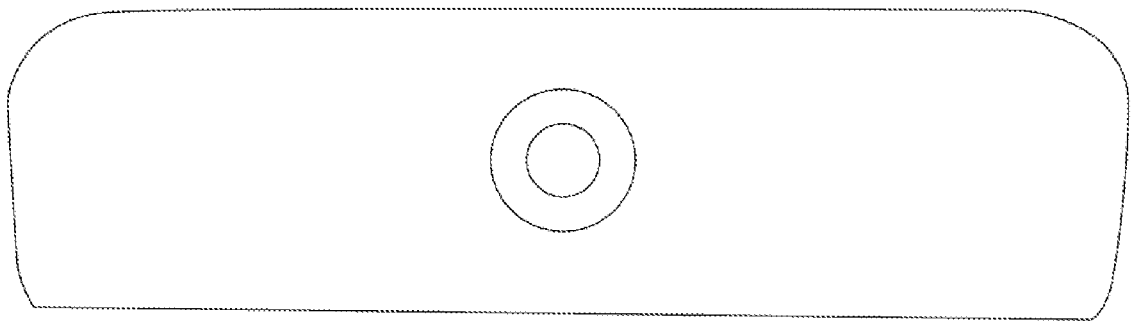
FIG. 5 illustrates first view of second bracket assembly, in accordance with an embodiment of the present disclosure.
Figure 6:
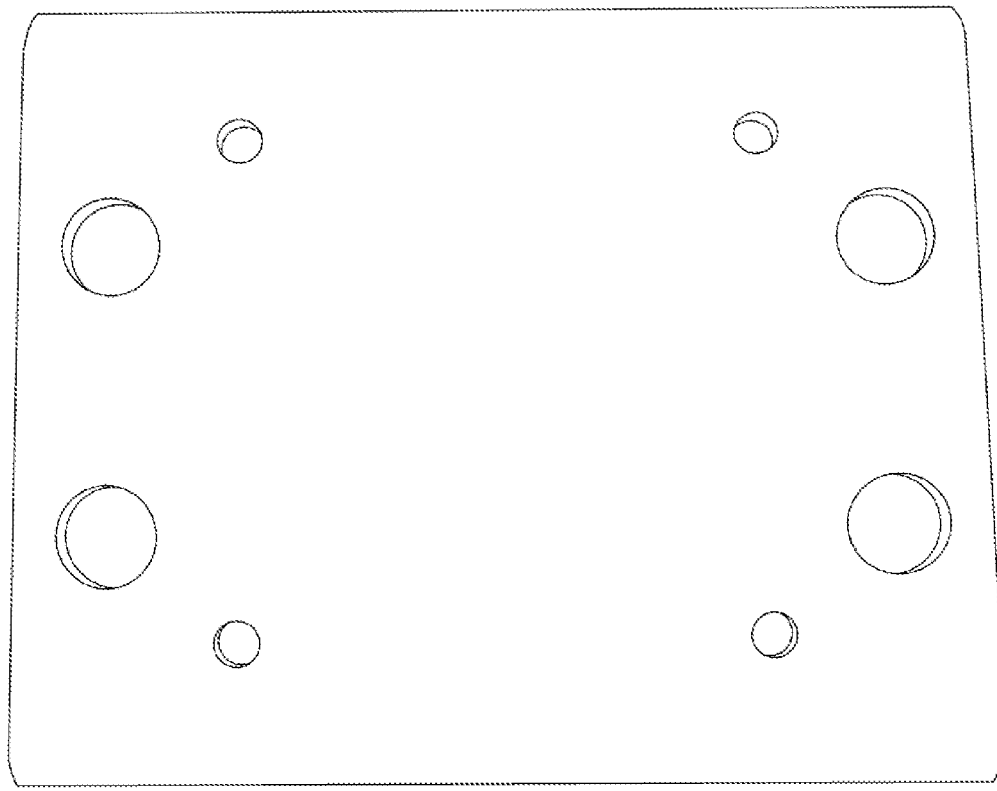
FIG. 6 illustrates second view of bracket assembly, in accordance with an embodiment of the present disclosure.
Figure 7:
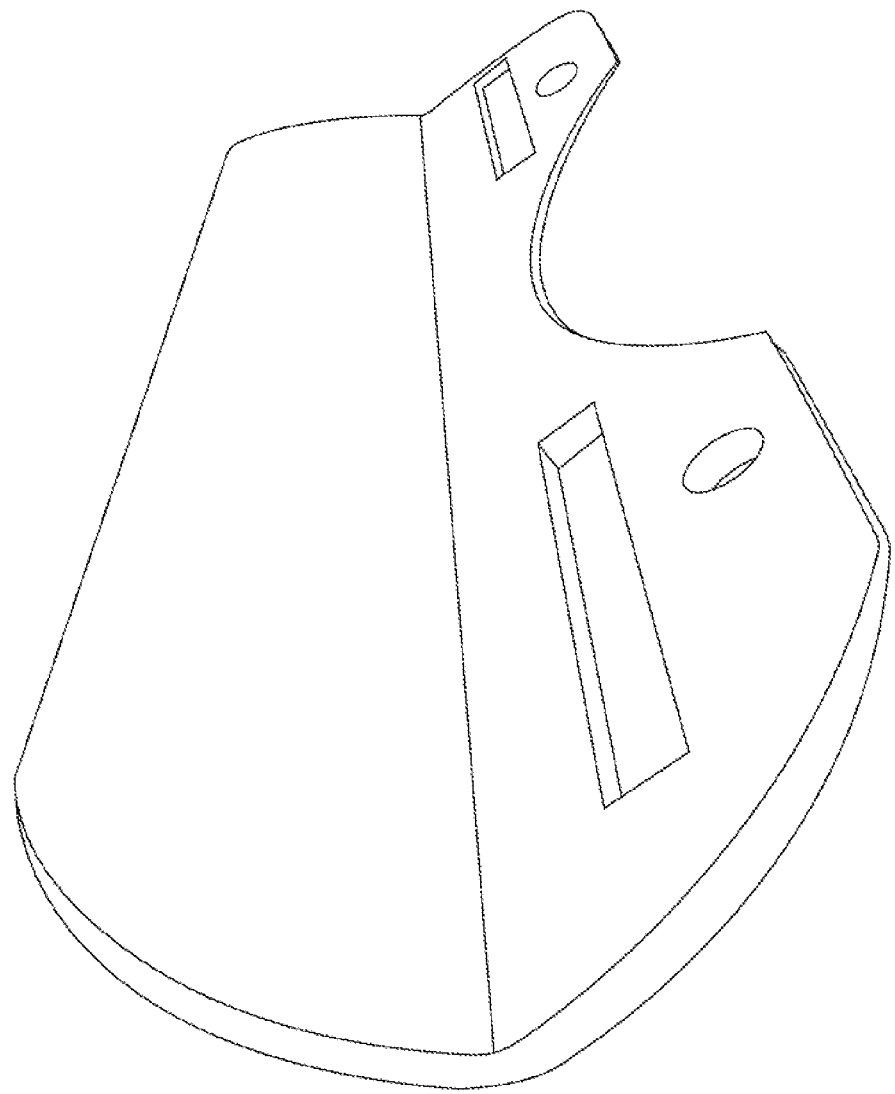
FIG. 7 illustrates third view of second bracket assembly, in accordance with an embodiment of the present disclosure.
Figure 8:
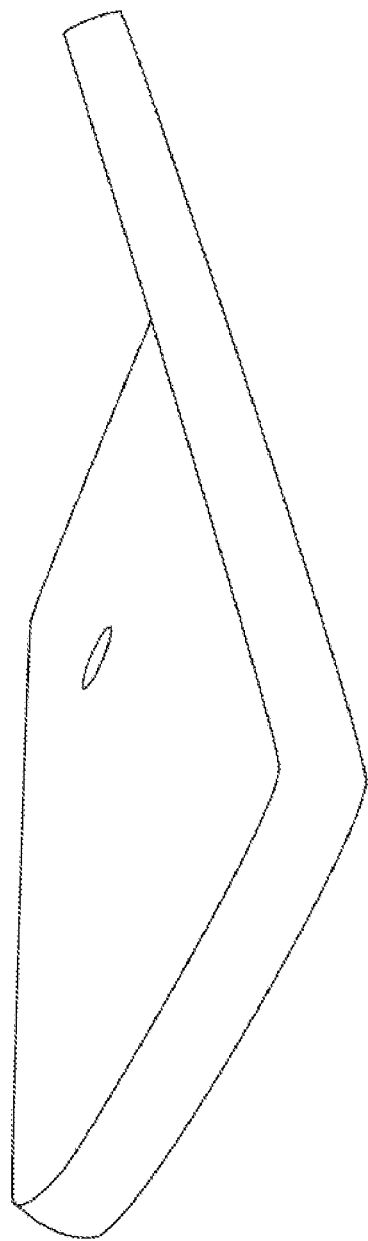
FIG. 8 illustrates fourth view of second bracket assembly, in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The purpose of this utility model is to overcome above-mentioned existing problems and deficiency, and provide a kind of bracket system especially designed for jet-ski, light in weight, simple and easy, easily attachable and detachable, is easy to carry and available in multiple colors.

In accordance with one aspect of the invention, the method for installing a speaker to a mounting panel in a water and land vehicle is proposed. The method includes providing a speaker bracket having at least one suspension member. The speaker is positioned with respect to a mounting panel whereby the suspension member engages the mounting panel thereby suspending the speaker from the mounting panel until the speaker is securely attached to the mounting panel.

In a preferred aspect of the invention, a speaker bracket attaches to the speaker. The bracket mounts use stainless steel mounting hardware, stainless steel nuts and bolts and it uses half inch rubber feet that allow it to conform to any type of flat or slightly rounded surface.

The speaker brackets mount to personal watercrafts allowing to mount a Bluetooth speaker to the ski. The bracket it requires no cutting or drilling and is a direct bolt on bracket to mount it to the glove box. The bracket is a universal bracket that amounts to any ski or any personal watercraft While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A speaker bracket for aligning and fastening a speaker to a mounting panel for installation in a water-based vehicles and land-based vehicles, the speaker bracket comprising:
a housing having a first surface and a second surface separated by a sidewall, the housing defining a first opening in the second surface having a longitudinal axis and further defining a second opening in the first surface,
wherein the first surface and the second surface are attached at a predefined obtuse angle, and
wherein the first opening comprises a first longitudinal slit and a second longitudinal slit.

2. The speaker bracket of claim 1 further comprising at least two fasteners independent from the speaker bracket and the mounting panel for attaching the speaker bracket to a vehicle mounting panel.

3. The speaker bracket of claim 1 mounts uses stainless steel mounting hardware stainless steel nuts and bolts.

4. The speaker bracket of claim 1, uses half inch rubber feet that allow it to conform to any type of flat or slightly rounded surface.

5. The speaker bracket of claim 1 is easily attachable and detachable and comes in variety of colors.

6. The speaker bracket of claim 1, wherein the second opening comprises a through-hole.

7. The speaker bracket of claim 6, wherein the through-hole is disposed at a center position of the first surface.

8. The speaker bracket of claim 1, wherein the first longitudinal slit and the second longitudinal slit are disposed horizontally in the second surface, and are aligned with each other.

9. The speaker bracket of claim 1, wherein the first longitudinal slit and the second longitudinal slit are disposed at a predefined distance from each other.

10. The speaker bracket of claim 1, wherein:
the first surface comprises a first longitudinal edge, a second longitudinal edge, a third side edge, and a fourth side edge,
the second surface comprises a fifth longitudinal edge, a sixth longitudinal edge, a seventh side edge, and an eighth side edge, and
the fifth longitudinal edge is attached to the second longitudinal edge.

11. The speaker bracket of claim 10, wherein the first longitudinal slit is disposed in proximity to the seventh side edge and the second longitudinal slit is disposed in proximity to the eighth side edge.

12. The speaker bracket of claim 11, wherein the second surface further comprises a first through-hole and a second through-hole.

13. The speaker bracket of claim 12, wherein the first through-hole is disposed in proximity to the seventh side edge and the second through-hole is disposed in proximity to the eighth side edge.

14. The speaker bracket of claim 12, wherein the first through-hole is aligned with the first longitudinal slit and the second through-hole is aligned with the second longitudinal slit.

15. The speaker bracket of claim 10, wherein the sixth longitudinal edge comprises a flat straight edge and an inward-round edge.

16. The speaker bracket of claim 15, wherein the inward-round edge is disposed at a center portion of the sixth longitudinal edge.

17. The speaker bracket of claim 15, wherein the inward-round edge is disposed between the first longitudinal slit and the second longitudinal slit.

18. The speaker bracket of claim 1, wherein the first surface is in direct contact with the second surface.

19. A speaker bracket to mount a speaker, the speaker bracket comprising:
a first surface comprises a first longitudinal edge, a second longitudinal edge, a third side edge, and a fourth side edge; and
a second surface comprises a fifth longitudinal edge, a sixth longitudinal edge, a seventh side edge, and an eighth side edge, wherein:
the fifth longitudinal edge is attached to the second longitudinal edge, and wherein the second surface comprises a first longitudinal slit and a second longitudinal slit disposed at a predefined distance from each other.

20. A speaker bracket to mount a speaker, the speaker bracket comprising:
a first surface having a through-hole; and
a second surface attached to the first surface at a predefined obtuse angle, wherein the second surface comprises a first longitudinal slit and a second longitudinal slit disposed at a predefined distance from each other.

* * * * *